G. H. CLIFF.
Devices for Transmitting Motion.

No. 158,035. Patented Dec. 22, 1874.

Witnesses:
John Euerding
D. L. Collier

Inventor:
George H. Cliff,
by J. Snowden Bell
Atty.

UNITED STATES PATENT OFFICE.

GEORGE H. CLIFF, OF PHILADELPHIA, PENNSYLVANIA.

IMPROVEMENT IN DEVICES FOR TRANSMITTING MOTION.

Specification forming part of Letters Patent No. 158,035, dated December 22, 1874; application filed December 3, 1874.

*To all whom it may concern:*

Be it known that I, GEORGE H. CLIFF, of the city and county of Philadelphia, in the State of Pennsylvania, have invented a certain new and useful Device for Transmitting Motion, of which the following is a specification:

The object of my invention is to provide simple and efficient means for the transmission of rotary motion from a driving-shaft to a driven shaft of relatively decreased velocity, to the special end of reducing the number of shafts and gears heretofore employed where great reduction of velocity is required, and to avoid the employment of worm and worm-wheel gearing, as well as to provide great compactness and economy of space in the mechanism.

My invention consists in combining two gear-wheels, secured together and set loosely on an eccentric upon a driving-shaft, with a stationary internal gear, and a movable internal gear secured upon a driven shaft, said gear-wheels respectively meshing into said internal gears, and being relatively differently proportioned in diameter thereto, as hereinafter more fully set forth.

The improvement is readily adaptable for use in elevators, marine railways, and numerous other mechanical constructions wherein a rapid velocity of the prime mover is to be communicated to a slowly-moving driven shaft, and from the reduction of the number of working parts and frictional surfaces, and the compact disposition of members which it provides, it offers peculiar advantages for practical adaptation.

Figure 1:
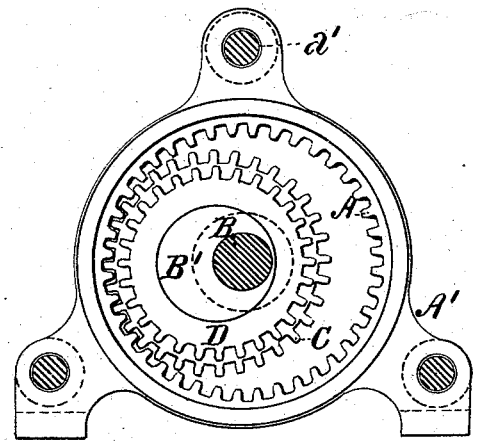
Figure 2:
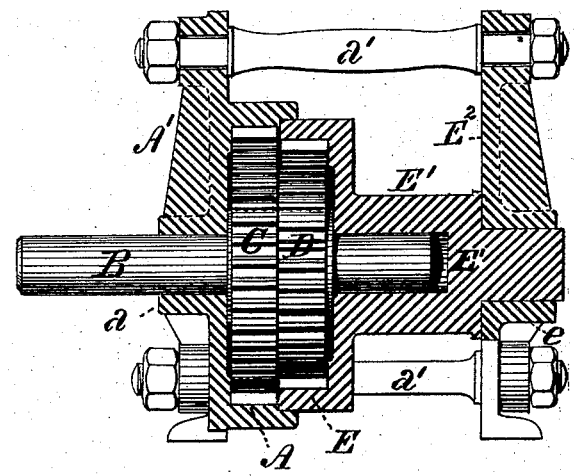
Figure 3:
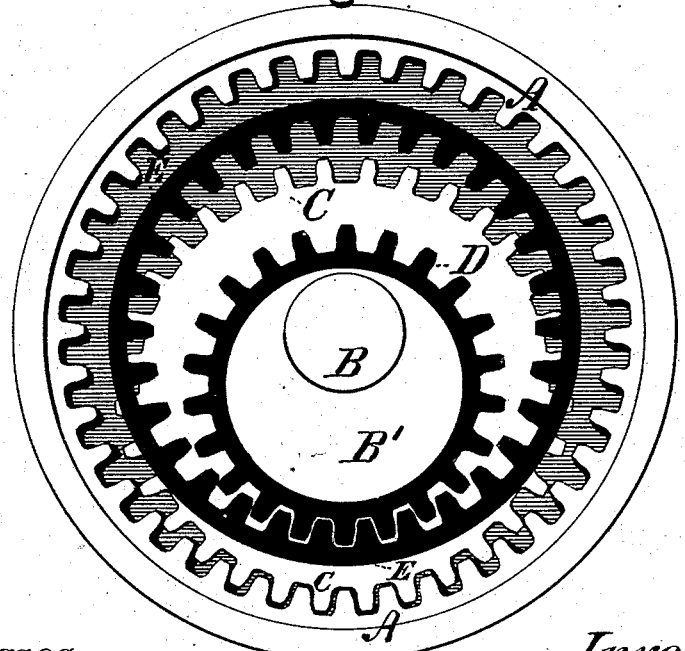

In the accompanying drawings, Figure 1 is a transverse section of an apparatus for transmitting motion embodying my improvement, the internal gear of the driven shaft being removed to exhibit the construction more clearly; Fig. 2, a longitudinal central section of the same with the gear-wheels in elevation; and Fig. 3, a diagram, on an enlarged scale, of the gear-wheels, internal gears, and driving-shaft, exhibiting a different ratio of gearing from that in Fig. 1.

A stationary internal spur-gear, A, is formed upon a frame, A', having a bearing, $a$, for the driving-shaft B, which, in this instance, is prolonged into the concentric driven shaft $E^1$, which rotates in a bearing, $e$, on a frame, $E^2$. The frames A' and $E^2$ are connected by shouldered bolts or columns $a'$. An eccentric, B', is secured upon the driving-shaft B, upon which eccentric the spur-gear wheels C and D are fitted, so as to turn freely, and are permanently secured together. The diameter and pitch of the gear-wheel C are such as to permit it to mesh with the stationary internal spur-gear A, and to be kept continuously in gear therewith by the traverse of the eccentric B'. The gear C has, therefore, a compound movement both around the center of the driving-shaft and around that of the eccentric, and the gear D, being connected to it, has, consequently, a corresponding compound movement. The gear D is of smaller diameter than C, and meshes into an internal gear, E, which is formed upon or secured to the driven shaft $E^1$, and revolves therewith. The shaft $E^1$ will, therefore, be rotated by the gear D.

The proportions of the gears D and E must be such as that the traverse of the eccentric B' will cause them to be kept continuously in gear with each other, as in the former instance; but their ratio to each other must be different from that of the gears C and A.

Instead of mounting the gears C and D upon an eccentric, as described, they can be arranged to rotate upon a crank-pin, if preferred, when their dimensions are such as to permit of this method of construction.

The operation of the device may be illustrated by an apparatus in which the stationary internal gear A has forty teeth; the gear C, thirty-two teeth; the internal gear E of the driven shaft, thirty-eight teeth; and the gear D, which meshes into it, thirty teeth, all four gears being of uniform pitch. In such case the gear C will, of course, make one revolution around the center of the driving-shaft at each revolution of the latter; but as the stationary internal gear A has forty teeth, the thirty-two teeth of the gear C will have been during one revolution in gear with forty teeth on the stationary gear A, and the gear C will, therefore, have made one and a quarter revolution around its own center. The gear D, to which it is connected, will, likewise, have made one and a quarter revolution, and each of its teeth will have passed through one and a quarter times its pitch-circle, or thirty-seven and one-half times its pitch. The length of the pitch-circle of the movable internal gear E being thirty-eight times the pitch of the gear D, it follows that the gear E will be rotated for a distance of one-half of its pitch (thirty-eight minus thirty-seven and one-half) at each revolution of the driving-shaft; and as the half-pitch is contained seventy-six times in the pitch-circle of gear E, seventy-six revolutions of the driving-shaft will be required to impart one revolution to the gear E.

The relative velocities of the driver and driven shaft may be infinitely varied, being dependent upon the relative proportions of the external and internal gears; but it will be obvious from the above illustration that, if the ratio of the gear D to the gear E is the same as that of C to A, no movement of the gear E will take place.

I am aware that spur-gears mounted eccentrically upon shafts have been heretofore known, and do not, therefore, broadly claim such device.

I claim as my invention—

The combination of a driving-shaft, two gear-wheels, united together and loose on an eccentric upon the driving-shaft, and a stationary and a movable internal gear, into which the gear-wheels respectively mesh, substantially as set forth.

GEO. H. CLIFF.

Witnesses:
J. SNOWDEN BELL,
G. R. ALEXANDER.